US008554683B2

(12) United States Patent
Knapp et al.

(10) Patent No.: US 8,554,683 B2
(45) Date of Patent: Oct. 8, 2013

(54) CONTENT SECURITY FOR REAL-TIME BIDDING (75) Inventors: Jason J. A. Knapp, Solana Beach, CA (US); Fabrízio Blanco, Los Angeles, CA (US)

(73) Assignee: Fox Audience Network, Inc., Los Angeles, CA (US)

( * ) Notice: Subject to any disclaimer, the term of this patent is extended or adjusted under 35 U.S.C. 154(b) by 183 days.

(21) Appl. No.: 12/986,985

(22) Filed: Jan. 7, 2011

(65) Prior Publication Data
US 2011/0173126 A1    Jul. 14, 2011

Related U.S. Application Data (63) Continuation-in-part of application No. 11/959,385, filed on Dec. 18, 2007, now abandoned.

(60) Provisional application No. 60/876,026, filed on Dec. 19, 2006, provisional application No. 61/293,430, filed on Jan. 8, 2010.

(51) Int. Cl.
*G06Q 30/02* (2012.01)
*G06Q 30/00* (2012.01)

(52) U.S. Cl.
USPC ................ 705/51; 705/14.4; 705/14.71

(58) Field of Classification Search
USPC .............................................. 705/14.4, 14.7
See application file for complete search history.

(56) References Cited

U.S. PATENT DOCUMENTS

| 6,285,987 | B1 | 9/2001 | Roth et al. |
| 6,324,519 | B1 | 11/2001 | Eldering |
| 6,487,538 | B1 | 11/2002 | Gupta et al. |
| 6,725,203 | B1 | 4/2004 | Seet et al. |
| 6,763,334 | B1 | 7/2004 | Matsumoto et al. |
| 7,038,637 | B1 | 5/2006 | Eller et al. |
| 7,085,732 | B2 | 8/2006 | Gould |
| 7,428,555 | B2 * | 9/2008 | Yan ..................................... 1/1 |
| 2002/0029186 | A1 | 3/2002 | Roth et al. |
| 2002/0107787 | A1 | 8/2002 | Mashinsky et al. |
| 2003/0055729 | A1 | 3/2003 | Bezos et al. |
| 2003/0220866 | A1 | 11/2003 | Pisaris-Henderson et al. |
| 2004/0044571 | A1 | 3/2004 | Bronnimann et al. |
| 2004/0111319 | A1 | 6/2004 | Matsumoto et al. |
| 2004/0148222 | A1 | 7/2004 | Sabella et al. |
| 2004/0267612 | A1 | 12/2004 | Veach |

(Continued)

FOREIGN PATENT DOCUMENTS

| JP | 2002-163549 | 6/2002 |
| WO | WO00/33163 | 6/2000 |

(Continued)

OTHER PUBLICATIONS

Young, Lee W.; International Search Report and Written Opinion; Apr. 23, 2008, filed in Applicant's related PCT patent application No. PCT/US07/088002.

(Continued)

*Primary Examiner* — Evens J Augustin
(74) *Attorney, Agent, or Firm* — Dentons US LLP (57) ABSTRACT

A real-time-bidding process that includes security mechanisms that limits access to various aspects of the bidding process including communications between bidders, the user browser, and the auctioneer, and the content of bids received and utilized by the user browser.

22 Claims, 3 Drawing Sheets

(56) References Cited

U.S. PATENT DOCUMENTS

| | | |
|---|---|---|
| 2005/0027594 A1 | 2/2005 | Yasnovsky et al. |
| 2005/0033682 A1 | 2/2005 | Levy et al. |
| 2005/0038900 A1 | 2/2005 | Krassner et al. |
| 2005/0137939 A1 | 6/2005 | Calabria et al. |
| 2005/0144064 A1 | 6/2005 | Calabria et al. |
| 2005/0216335 A1 | 9/2005 | Fikes et al. |
| 2005/0228746 A1 | 10/2005 | McHale et al. |
| 2005/0267805 A1 | 12/2005 | Tarantino |
| 2006/0074752 A1 | 4/2006 | Newmark |
| 2006/0095281 A1 | 5/2006 | Chickering et al. |
| 2006/0095336 A1 | 5/2006 | Heckerman et al. |
| 2006/0106709 A1 | 5/2006 | Chickering et al. |
| 2006/0106710 A1 | 5/2006 | Meek et al. |
| 2006/0122907 A1 | 6/2006 | Gould |
| 2006/0129453 A1 | 6/2006 | Gardner et al. |
| 2006/0178900 A1 | 8/2006 | Shilo et al. |
| 2006/0190333 A1 | 8/2006 | Choi |
| 2006/0190385 A1 | 8/2006 | Dresden |
| 2006/0212350 A1 | 9/2006 | Ellis et al. |
| 2006/0224447 A1 | 10/2006 | Koningstein |
| 2006/0230029 A1* | 10/2006 | Yan ................................ 707/3 |
| 2006/0271426 A1 | 11/2006 | Borgs et al. |
| 2006/0271429 A1 | 11/2006 | Borgs et al. |
| 2007/0027768 A1* | 2/2007 | Collins et al. ............... 705/14 |
| 2007/0087756 A1* | 4/2007 | Hoffberg ..................... 455/450 |
| 2008/0162329 A1 | 7/2008 | Knapp et al. |
| 2009/0012903 A1 | 1/2009 | Subramanian et al. |
| 2009/0043648 A1* | 2/2009 | Mahdian et al. .............. 705/14 |
| 2009/0083190 A1 | 3/2009 | Isshiki et al. |
| 2009/0327029 A1* | 12/2009 | Collins ........................... 705/10 |
| 2010/0057556 A1* | 3/2010 | Rousso et al. ............. 705/14.44 |
| 2011/0225608 A1* | 9/2011 | Lopatecki et al. ............... 725/34 |
| 2011/0258049 A1* | 10/2011 | Ramer et al. ............... 705/14.66 |
| 2012/0209710 A1* | 8/2012 | Ramer et al. ............... 705/14.51 |

FOREIGN PATENT DOCUMENTS

| | | |
|---|---|---|
| WO | WO00/41105 | 7/2000 |
| WO | WO01/43027 | 6/2001 |
| WO | WO03/025823 | 3/2003 |
| WO | WO03/058531 | 7/2003 |
| WO | WO2004/068299 | 8/2004 |
| WO | WO2006/026030 | 3/2006 |
| WO | WO2006/062760 | 6/2006 |
| WO | WO2006/096768 | 9/2006 |
| WO | WO2006/097826 | 9/2006 |
| WO | WO2006/104845 | 10/2006 |
| WO | WO2006/127645 | 11/2006 |
| WO | WO2006/128104 | 11/2006 |
| WO | WO2008/077078 | 6/2008 |

OTHER PUBLICATIONS

Young, Lee W.; Transmittal of international Search Report and Written Opinion mailed on Mar. 7, 2011 in Applicants' co-pending PCT International Application No. PCT/US2011/020584.

* cited by examiner

CONTENT SECURITY FOR REAL-TIME BIDDING

This patent application is a continuation in part of U.S. patent application Ser. No. 11/959,385 filed Dec. 18, 2007 now abandoned, which claims priority to U.S. Provisional Application Serial No. 60/876,026 filed Dec. 19, 2006. This application also claims the benefit of U.S. Provisional Application Serial No. 61/293,430 filed Jan. 8, 2010. These above-listed patent applications, as well as the information disclosure statement filed on Jul. 2, 2008 in connection with the above-identified '385 patent application, are incorporated herein by this reference.

BACKGROUND OF THE INVENTION

1. Field of the Invention

This invention relates generally to online advertising, and in particular, to a method, apparatus, and article of manufacture for encrypting/securing/data/content during a real-time advertising auction process.

2. Description of the Related Art

Online advertising has become an integral part of the Internet. Different models exist for advertisers to purchase advertisements displayed to end-users. Further, advertisers are often willing to pay a premium for a targeted advertisement based on a user's profile, demographic, etc. Online auctions that are controlled by an end-user's browser may be utilized to sell a particular advertisement/impression for a particular user. However, in such an online auction, it is desirable to maintain security of (i.e., limited access to) all of the data exchanged (e.g., user privacy and advertiser data security).

Prior art mechanisms fail to provide a secure environment for such an online auction. These problems may be better understood with a more detailed description of prior art online display advertising and bidding processes.

Online display advertising faces many inefficiencies in supply and demand. On the supply side, large publishers and ad networks sell excess inventory in bulk, yielding an eCPM (effective cost per thousand impressions). As used herein, the term "impression" refers to a view, ad view, or load of an advertisement. On the demand side, ad networks and exchanges that have gathered unique demographic, behavioral, and interest information on end users are not able to find all the impressions they need to fulfill their budgets. In general, the core of the inefficiency is two-fold—(1) different siloed auctioning systems do not talk to one another on an impression-by-impression basis; and (2) buyers do not have access to their cookies on the end user before taking possession of the impression.

Cookies are small pieces of text stored on a user's computer by a web browser. The information in the cookie is sent from a particular domain to the web browser and each particular cookie is only accessible from the domain that originally sent the information. Consequently, oftentimes, an advertiser has knowledge about particular users (i.e., their preferences, practices, etc.), but when a third-party web-page has code that instructs the browser to request an advertisement, the advertiser does not have access to the end-user's cookies before purchasing the advertisement impression.

A real-time bidding (RTB) mechanism may address the common web based advertising issues by providing the framework for an impression-by-impression first price or a second price auctioning system. Details describing such an RTB mechanism are described in U.S. patent application Ser. No. 11/959,385 filed on Dec. 18, 2007 which is incorporated by reference herein. RTB allows potential buyers of an impression to look at that individual impression and decide the bid amount using their own systems and data (behavioral, profile, etc.). Bidding is not for a group of impressions but for one specific impression. Further, the bidding occurs as the impression occurs and not in advance of the impression. Accordingly, information useful to bidding on a particular impression is known by the bidder. A browser-side RTB auction takes place inside the end user's browser, soliciting bids from the siloed systems, awarding the win to the highest bidder, and charging that bidder the amount it had bid. Unlike server-to-server or bid application programming interface (API) approaches, in a browser-side RTB mechanism, bidders have access to their own respective cookies on the end user in real time which allows for cross platform frequency cap and budget management, in addition to live behavioral and profile targeting. As a result, browser-side RTB allows buyers (known as bidders) to obtain substantially more impressions of highest value to them, allowing them to deliver larger, more valuable campaigns to their advertisers, while translating all this to higher yields for end publishers.

One problem with the existing RTB mechanism is that of privacy/security for the both the user and the advertiser. In other words, an advertiser may build an extensive proprietary knowledge base (e.g., behavioral or profile information for a particular user, frequency information such as when and how often different ads are served to a particular user, etc.). Further, the advertiser may develop a proprietary bidding strategy for impressions in an RTB based system. Accordingly, it is desirable to protect data while the data is in the browser. In addition, it is desirable to obfuscate portions of the data as it passes through the browser from all parties (including the browser itself) (i.e., it is desirable to obfuscate communications and bidding details once received). In this regard, an advertiser/bidder may not want competitors to know/learn anything about the bid or bid amount.

Further, it is desirable to restrict a phantom website from gathering metrics/statistics on the bidding process (e.g., by a competitor soliciting bids for selected advertisements). In other words, it is desirable to prevent a browser that is conducting an auction from accessing information regarding the winning bids for an impression or who the winning bidder is for a particular impression. The prior art not only fails to recognize the problems described above but also fails to provide any protection mechanism to solve the problems.

SUMMARY OF THE INVENTION

One or more embodiments of the invention overcome the problems of the prior art by establishing a real-time-bidding process that includes security mechanisms that limits access to various aspects of the bidding process including communications between bidders, the user browser, and the auctioneer, and the content of bids received and utilized by the user browser.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Hardware Environment

Figure 1:
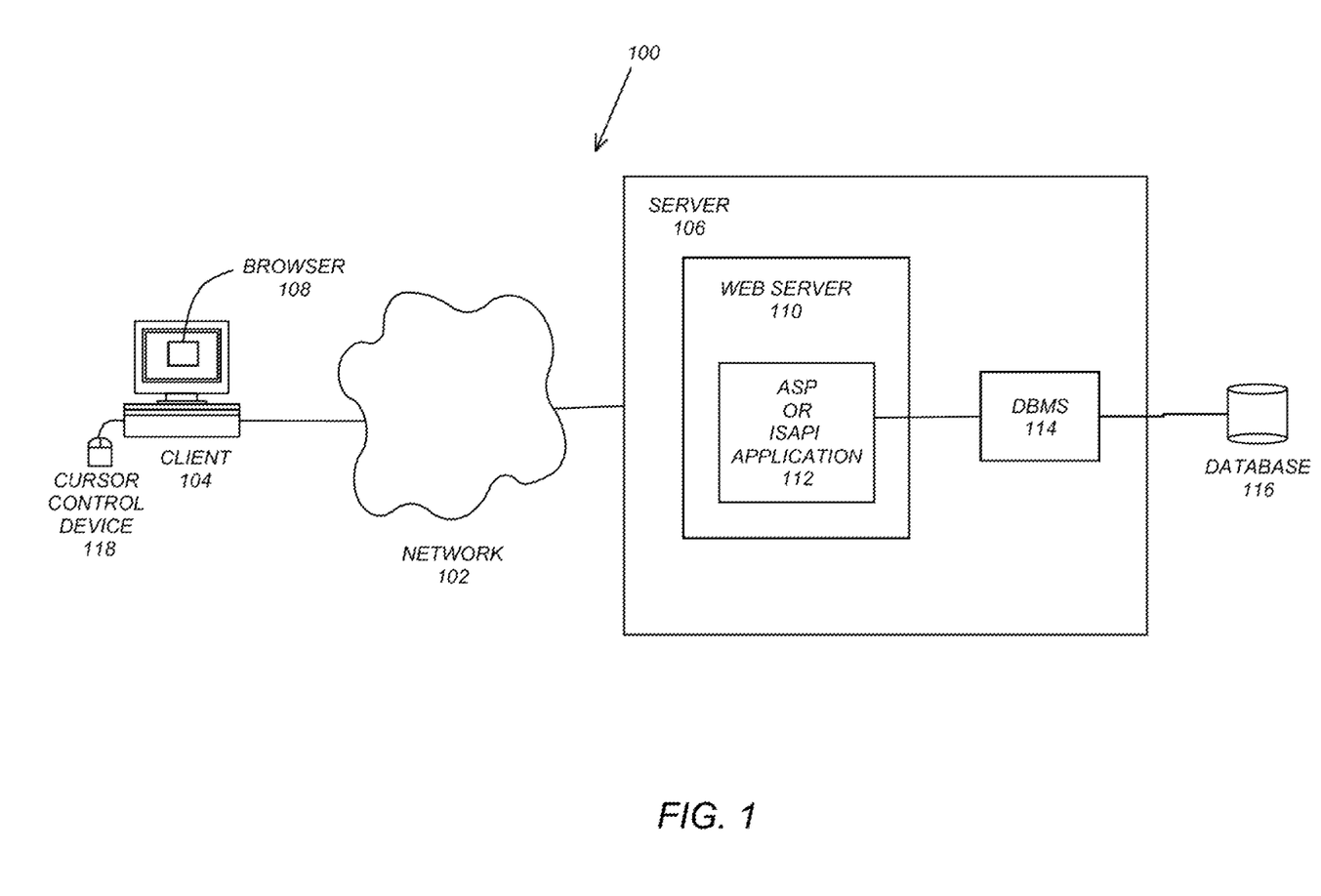
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, local area networks (LANs), wide area networks (WANs), systems network architecture (SNA) networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Network 102 may utilize ethernet, coaxial cable, wireless communications, radio frequency (RF), etc. to connect and provide the communication between clients 104 and servers 106. Clients 104 may execute a client application or web browser 108 and communicate with server computers 106 executing web servers 110. Such a web browser 108 is typically a program such as MICROSOFT™ INTERNET EXPLORER™ Further, the software executing on clients 104 may be downloaded from server computer 106 to client computers 104 and installed as a plug-in or ACTIVEX™ control of a web browser. For example, an auction/bidding application may be downloaded from the server 106 and installed on web browser 108. In such an application, as described in further detail below, client 104 is configured to communicate with multiple servers 106, some of which are advertisers/bidders bidding on an impression that is to be displayed on web browser 108.

Accordingly, clients 104 may utilize ACTIVEX™ components/component object model (COM) or distributed COM (DCOM) components to provide a user interface on a display of client 104. The web server 110 is typically a program such as MICROSOFT'S INTERNET INFORMATION SERVER™.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of, or connected directly to client 104 instead of communicating/obtaining the information from database 116 across network 102. When a developer encapsulates the business functionality into objects, the system may be referred to as a COM system. Accordingly, the scripts executing on web server 110 (and/or application 112) invoke COM objects that implement the business logic. Further, server 106 may utilize Microsoft's Transaction Server (MTS) to access required data stored in database 116 via an interface such as ADO (Active Data Objects), OLE DB (Object Linking and Embedding DataBase), or ODBC (Open DataBase Connectivity).

Generally, these components 108-118 all comprise logic and/or data that is embodied in, or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, system, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. For example, rather than utilizing the browser/web server based implementation of FIG. 1, embodiments of the invention can be implemented using any application that can execute the functionality described herein over an IP (internet protocol) network. In this regard, embodiments of the invention may be utilized to determine advertisements in a game, IPHONE™ application, IPOD™ TOUCH™ application, personal digital assistant (PDA) application, cellular phone device, or any type of application executing over an IP network or other type of network.

User Environment

Embodiments of the invention may be utilized by bidders and sellers using RTB. The number of participants that may participate in the bidding process may be limited by practicality. In this regard, performance may be impacted as more bidders are added due to the need for the browser to issue separate calls to each bidder. Given such limitations, target participants may include companies that introduce exclusive inventory, exclusive data about end users, or exclusive advertiser campaigns, such as:

Large publishers that own portals or social networking sites;

Exchanges that have amassed remnant inventory from thousands of smaller publishers and/or have large pools of advertisers that manage their campaigns on the exchange and have unique user profile or behavioral data stored within the platform;

first-class sales forces that have direct advertiser relationships and access to budgets, and have unique user profile or behavioral data on millions of end users that they want to target through their own platform or cookies; and     Advertising agencies and/or technology vendors.

However, embodiments of the invention are not limited to the above-identified participants. For example, RTB may be utilized for ad agencies across their clients in a "demand-side platform" based implementation.

| Term | Definition |
|---|---|
| Auctioneer | The party that initiates the RTB auction by sending the RTB code to the browser. This is usually a publisher, an ad network, or an exchange. |
| Bidder | The party that wants to bid on an impression. There will usually be more than one bidder per impression. |
| Biding event | A single impression at the auctioneer that is translated to unique bid request calls to each of the chosen bidders for that event, where each of the bidders receives on bid request call each. Also known as an RTB auction. |
| First price sealed bid auction | One of the most common forms of auctions. Each bidder submits a single sealed bid simultaneously with all bidders, so that no bidder knows the bid of any other bidder. The highest bidder pays the price they submitted. RTB is a first price sealed bid auction. This is different from second price auction variations where the winner pays the second highest bid plus an increment (e.g. $0.01 or 5%). |
| JSON | JavaScript Object Notation is a lightweight data-interchange format. Its syntax and spec are found at http:/www.json.org. JSON is humanly readable and interpreted quickly on browsers due to it being already in native JavaScript variable format. The RTB request's response is a JSON object: For example: {"r":{"sb":36915,"s":"heyty3rdel","ad":"http://bid.bidder.com?var2=26463&size=160600&random=633456915","mt":30}} |
| Private key encryption | A symmetric encryption method that uses the same key to encrypt and decrypt data. It is made up of two parts: an algorithm and a private key. The algorithm is agreed upon by all auctioneers and bidders. However, each pair of auctioneer and bidder shares a unique private key. With mutual agreement, they may change this key at any time. |
| Reserve CPM | The CPM price of the creative that will act as the floor for the RTB auction. The auctioneer will only award the bid to a bidder if the bidder's CPM is higher than this reserve price. |
| Reserve creative | The winning creative of the first/internal auction that is either decided upon by the publisher, or by the auctioneer. The auctioneer will then conduct the RTB auction to see if any other bidder can outbid the reserve creative's CPM. |
| RTB | Acronym for the Real-Time Bidding system, processes, code, security mechanism and guidelines as disclosed in U.S. patent application Ser. No. 11/959,385 filed on Dec. 18, 2007. RTB refers to both Real-Time Selling and Real-Time Buying. |
| Scale | A way to obfuscate actual CPM values from those who check the browser's code after a bidding event or who intercept other events' browser communication. The scale is an integer and is decided upon by the auctioneer. It is shared by all bidders for a single impression, but is different from one impression to the next. For example, if the scaling factor is 24, instead of returning $2.00 CPM, the bidder will return $48.00 CPM. |
| Signature | The result of a non-reversible function used to verify that data has not been tampered with. This result could also be called checksum, fingerprint, or hash value. |

RTB Conceptual Mechanism Process

The RTB mechanism conceptually works as follows:

1. The auctioneer will have shared, a priori, a different private key with each bidder.

2. The user's browser will make a request for an ad impression from the auctioneer's ad server, using that server's standard ad tag embedded in the web page.

3. The auctioneer will conduct an auction internal to its system, and decide on the best traditional (not including RTB opportunities) creative it has. This creative is called the reserve creative, and it has a reserve CPM set by the auctioneer.

4. The auctioneer will decide who amongst the number of ready bidders will be chosen to bid for this impression. A variety of different mechanisms may be utilized to control the volume of calls to any particular bidder (e.g., to help limit scale issues. For example, impressions can be randomly skipped or a sophisticated selection algorithm may be utilized. An example of one potential volume control implementation includes:

Not calling a bidder, for a specific end user, for a number of minutes specified by the bidder on the last bid response for this user to the auctioneer, if any was provided. This allows bidders to throttle the number of bids they are receiving based on their system capacity.

Limiting the calls per hour to a particular bidder to a set number and discontinuing calling a particular bidder for a designated period when the bidder loses an auction for that particular end user. The specific mechanisms for these are set by the auctioneer within its ad server and are outside the scope of this document.

5. The auctioneer will decide on a scale factor for this impression and send to the browser the RTB JavaScript detailed in Appendix A (which is incorporated by reference herein). This contains a number of elements:

(a) The scaled version of the auctioneer's reserve CPM price. This value is passed unencrypted to the browser and is the auctioneer's estimate of what this impression is worth based on competition available in the form of direct-sold offers (CPM, CPC [cost per click] or CPA [cost per auction/sale]), and non-RTB ad network partners. It may be noted that a bid may be received in CPC or CPA form that could then be converted into a CPM to include in the auction.

(b) The URL (uniform resource locator) of the ad selected above by the auctioneer. If no bidder wins the auction, this will be the ad displayed to the end user.

(c) For each chosen bidder on this impression, a unique URL that contains the following elements:
  (1) The version of the API (application programming interface) that the auctioneer is using to communicate with the Bidder.
  (2) The encryption version (algorithm and key) used.
  (3) An encrypted string that combines the scale and the current timestamp.
  (4) Other optional parameters such as demographic, behavioral, contextual information about the end user or the impression, in general.

6. The browser then initiates the specific RTB calls to the bidders selected for consideration for this impression, and waits for all responses to be received up to a predefined maximum amount of time.

7. Since the bid request is from the browser to the bidder's ad server, the bidder will be connected to the end user's browser from within the bidder's own domain. This allows the bidder to read all necessary cookies in the same manner as a regular redirected ad impression. Moreover, this allows the bidder to enforce ad eligibility, frequency controls, delivery and geography controls, etc. in the same manner as regular redirected impressions.

8. All bidders respond in the designated JSON format with the following key elements:
  (a) The bidder's predicted scaled bid CPM for this impression. This value is unencrypted.
  (b) A signature embodying the scaled bid CPM and the timestamp.
  (c) The bidder's creative URL to which the impression should be redirected if the bidder wins.
  (d) Other optional parameters. For instance, minutes for the auctioneer to wait before sending another bid request for this user to this bidder's URL.

9. Once the browser receives responses from all bidders or the predetermined amount of time expires, the browser's JavaScript code compares the scaled bids received with the scaled reserve CPM, selects the winning ad, and redirects the browser to the appropriate URL.

10. Finally, the user's browser makes a special pixel call back to the auctioneer's ad servers to record the details of the winning ad and update the serving counts accordingly.

Figure 2:
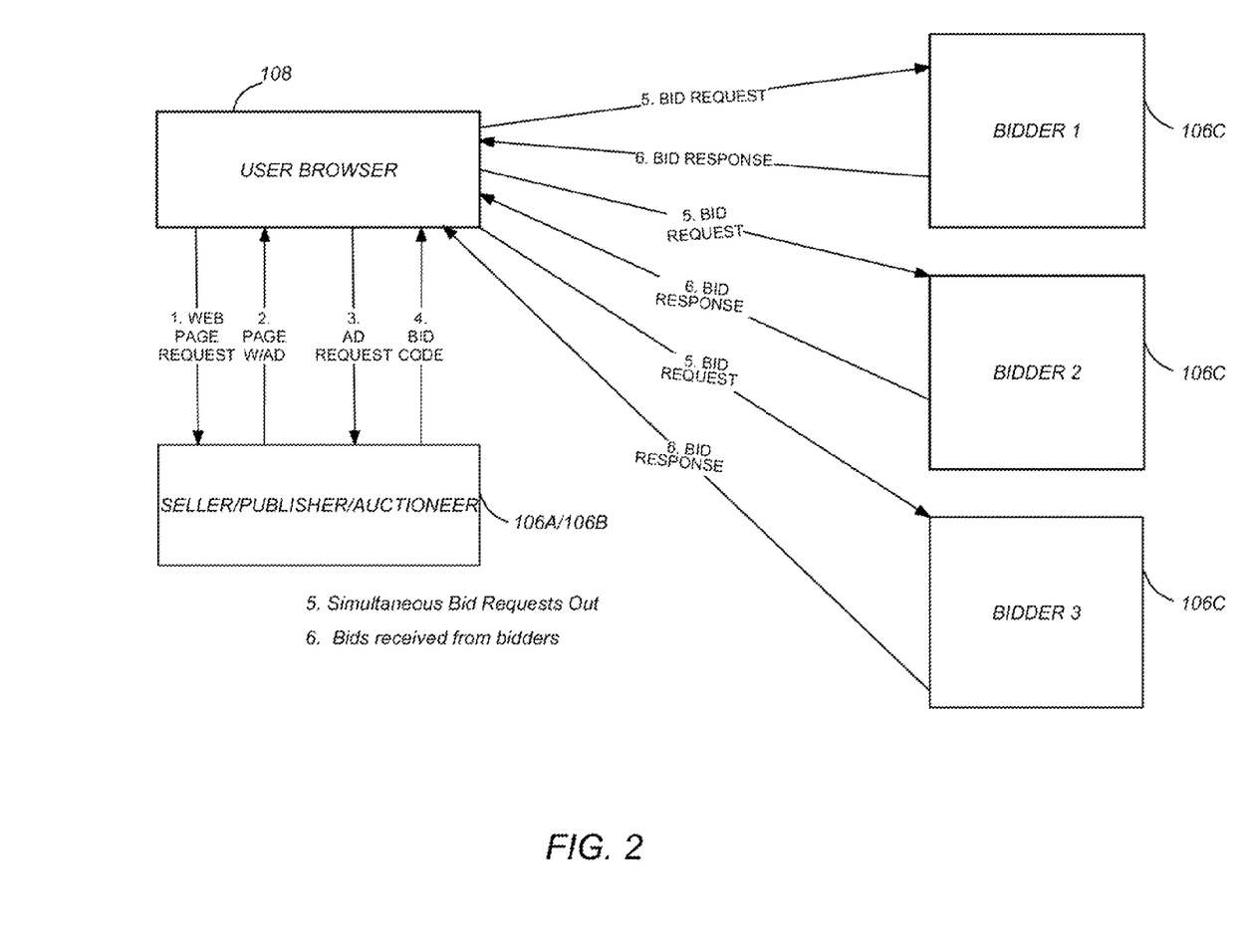
FIG. 2 illustrates a hardware and software configuration used in accordance with one or more embodiments of the invention.
Figure 3:
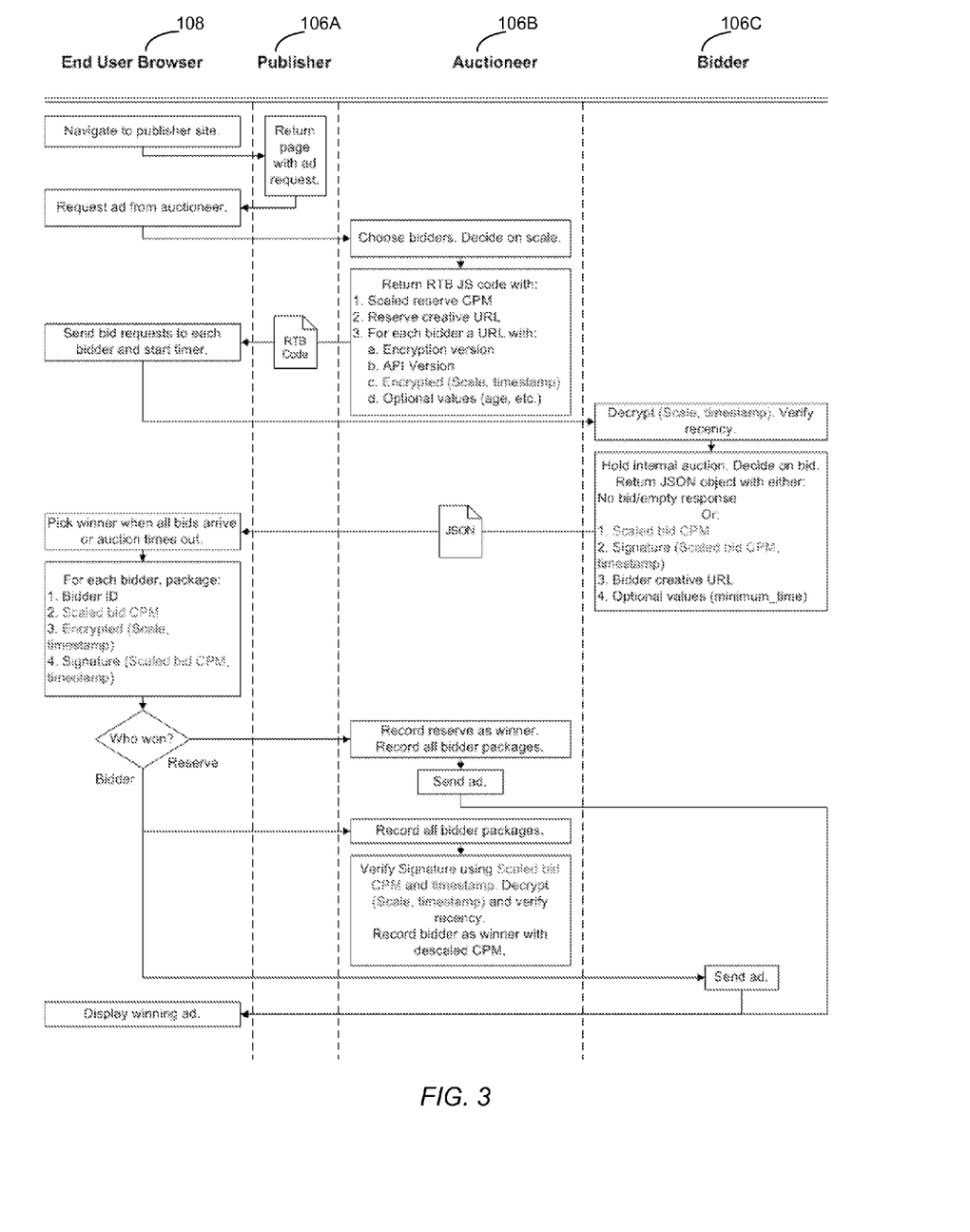
FIG. 3 illustrates a real-time workflow utilized in accordance with one or more embodiments of the invention.

FIG. 2 illustrates a hardware and software configuration used in accordance 5 with one or more embodiments of the invention. FIG. 3 illustrates a real-time workflow utilized in accordance with one or more embodiments of the invention (based on the configuration of FIG. 2). Referring to FIGS. 2 and 3, the end user browser 108 on client 104 navigates to a server or web site publisher 106A and requests a web page. In response, the publisher 106A returns a web page with an advertisement request embedded therein. When loading the web page, the browser 108 requests the advertisement from an auctioneer 106B. FIG. 2 illustrates the seller, publisher 106A, and auctioneer 106B as the same entity. In one or more embodiments, the seller, publisher 106A, and auctioneer 106B may reside on one or more different servers 106 or on the same server 106/set of servers 106.

The auctioneer 106B then selects bidders 106C and decides on a scale (i.e., the scaling factor used to obfuscate the actual CPM values as described above). The auctioneer 106B returns a RTB JavaScript™ (JS) code to the publisher 106A with a scaled reserve CPM, a reserve creative Uniform Resource Locator (URL), and for each bidder selected, a URL with (a) an encryption version; (b) an API version; (c) an encrypted scale and timestamp; and (d) optional values (e.g., age, etc.). The RTB code is then transmitted from the publisher 106A to the user browser 108. As described above, the encryption information includes the algorithm, key, and string used to encrypt the bidding information that is transmitted amongst the parties.

The code below is the humanly readable format of a minified JavaScript™ code that the auctioneer 106B will send to the user browser 108 in accordance with one or more embodiments of the invention:

```
< script >
/**
    An example of an auctioneer's request to a bidder, after
placeholder expansion:
http://bidder1.com/sz=300×250/loc=6239393/encryption_version=1.1/rnd
=78276872/sft=a8218b8282e92f928d/pv=2/dom=http%3A//www.google
.com/callback=C1RTB.b0Wl2Eh9Pv5Y
    An example of a bidder's response with a CPM $2.00 and a scale
factor of 3:
        C1RTB.b0Wl2Eh9Pv5Y={"r":{"sb":60000,"s":"6ef801f7621a","ad
":"http://bidder1.com/00004642/300250/6239393/k=NjcwODg3OjI0Njo
wOjAuMDAwMzEzMjowLjAwMDMxMzI6MC4wMDAzMTMyOjAuM
DAwMjM2MTU6MTox"},"mt":0};
    An example of no bid:
        C1RTB.b0Wl2Eh9Pv5Y={ };
**/
var C1RTB = {
    // Variables will have dynamically generated values. Final stored
information may vary
    v1ReserveInfo: {"r":
{"a":302230,"c":249376,"sb":52320,"ad":"http://auctioneer.com/bid/td/?
k=yODEwOTsxNzR8OzE7NDQ7Mzc0MzE2Mjs7MTc0NDs7Ozs=data
=[DATA]"}},
    v4TimeOut:500,
    v5InitTime:10,
    v6TimeSoFar:10,
    v7TimeIncrement:10,
    v8Width:300,
    v9Height:250,
    v12ProtocolVersion:"1",
    v13PubId:19282,
    v14PubCatId:1,
    v15MaxUrlLength:1024,
    time: (new Date( )).getTime( ),
    v10BiddersArray: {
        "b0Wl2Eh9Pv5Y":
        {"bidurl":"http://bidder1.com/sz=300×250/loc=6239393/encryption
_version=[ALGORITHM_VERSION].[KEY_VERSION]/rnd=[CACHE
BUSTER]/sft=[ENCRYPTED_SCALE_TIMESTAMP]/pv=
[API_VERSION]/dom=[DOMAIN]/callback=[CALLBACK]",
        "k":"NTI2MDI7Mzs2NzQ7MzkzNDI7MDU5MTAuOS44MDI1L
mZoLnh6Ljg1LjE5MkBAd2hvQEBoZm1tYmV6b3ZAQC0xXzlAQGJ6c2
xsIUBAeGxuQEBobGZnc2R2aGc7MTIzNDQ2MTc0NTU2OTsxOzI2M
jE1N3wyMjgxMDk7MTc0fDsxOzQ0OzM3NDMxNjI7Ozs7Ozs=",
        "a":52602,
        "c":39342,
        "sft":"a8218b8282e92f928d",
        "av":1,
        "kv":1
        },
        "b1Pv2Yt9Ji5U":
        {"bidurl":"http://bidder2.com/getbid/Z=300×250/s=321686/encr_
version=[ALGORITHM_VERSION].[KEY_VERSION]/_salt=[CACHE
BUSTER]/pid=[PUBLISHER_ID]/pubcatid=
[PUBLISHER_CATEGORY_ID]/r=1/cookie=[COOKIE]/flash=
[FLASH]/avs=[AGE]/gvs=[GENDER]/sft=
[ENCRYPTED_SCALE_TIMESTAMP]/protocolv=
[API_VERSION]/callback=[CALLBACK]",
```

```
    "k":"NzcyMDM7Mzs2NzQ7NjgxOTQ7MDU5MTAuOS44MDI1L
mZoLnh6Ljg1LjE5MkBAd2hvQEBoZm1tYmV6b3ZAQC0xXzlAQGJ6c2
xsIUBAeGxuQEBobGZnc2R2aGc7MTIzNDQ2MTc0NTU2OTsxOzI2Mj
E1N3wyMjgxMDk7MTc0fDsxOzQ0OzM3NDMxNjI7Ozs7Ozs=",
        "a":77203,
        "c":68194,
        "sft":"ba32421b825468d",
        "av":1,
        "kv":2
        }
    },
    v11GarbageCan: new Array( ),
    // [DOMAIN] to be populated by the auctioneer, either server side,
    // or at the browser with a JavaScript function. It is URL-encoded
    // dom: "http%3A//www.google.com",
    headElement:(document.getElementsByTagName("head").length ?
document.getElementsByTagName("head").item(0) :
document.getElementsByTagName("html").item(0)),
    cookieEnabled:function( ) {
        var cookieEnabled=(navigator.cookieEnabled)? 1 : 0;
        if (typeof navigator.cookieEnabled=="undefined" &&
!cookieEnabled){
            document.cookie="tc";
            cookieEnabled=(document.cookie.indexOf("tc")!=-1)? 1 :
0;
        }
        return cookieEnabled;
    },
    flashEnabled: function( ) {
        var flash=new Object( );
        flash.installed=0;
        flash.version='0.0';
        if (navigator.plugins && navigator.plugins.length) {
            for (x=0; x < navigator.plugins.length; x++) {
                if (navigator.plugins[x].name.indexOf('Shockwave Flash')
!= -1) {
flash.version=navigator.plugins[x].description.split('Shockwave Flash
')[1];
                    flash.installed=1;
                    break;
                }
            }
        } else if (window.ActiveXObject) {
            for (x=2; x<10; x++) {
                try {
                    oFlash=eval("new
ActiveXObject('ShockwaveFlash.ShockwaveFlash.'+x+'');");
                    if (oFlash) {
                        flash.installed=1;
                        flash.version=x+'.0';
                    }
                } catch(e) { }
            }
        }
        return flash.installed;
    },
    f1CallServer: function(url) {
        var script = document.createElement("script");
        script.setAttribute("type", "text/javascript");
        script.setAttribute("src", url);
        this.headElement.appendChild(script);
        return script;
    },
    f2AllDone: function( ) {
        var i;
        for (i in this.v10BiddersArray) {
            if (this[i] == undefined) return false;
        }
        return true;
    },
    // Go through every bidder, check if they responded, collect the
responses to report back,
    // compute the winner, display the winner and reports back
    // Actual implementation may vary by auctioneer, especially the
part related to
    // reporting back of the auction results
    f3PickWinner: function( ) {
        var i;
        var winnerid;
        var winnerad;
        var winnerk;
        var data="";
        var ja=this.v10BiddersArray;
        var rs=this.v1ReserveInfo;
        var
jt="http://auctioneer.com/bid/jt/?k=[WINNERK]data=[DATA]";
        var winnercpm=rs.r.sb;
        var maxallowedcpm=200000; // Should be the result of
                    // 10000 * scaling factor * max ecpm
allowed
        // Go through every eligible bidder, check if they returned,
        // determine winner and collect data
        for ( i in ja) {
            if (this[i] == undefined || this[i].r == undefined
|| this[i].r.sb == undefined || this[i].r.ad == undefined) { // Bidder
timed out or sent a malformed response
                data+=ja[i].a.toString(16)+"|"+ja[i].c.toString(16)+"|-1|-1|-
1|-1|-1.";
                continue;
            }
            // Limit bids to within 0 and maxallowedcpm
            if (this[i].r.sb < 0) this[i].r.sb=0;
            else if (this[i].r.sb > maxallowedcpm)
this[i].r.sb=maxallowedcpm;
            if (winnercpm < this[i].r.sb) {
                winnercpm=this[i].r.sb;
                winnerid=i;
            }
            // Collect bidder information to report back to
auctioneer
            data+=ja[i].a.toString(16)+"|"+ja[i].c.toString(16)+"|"+(parse
Int(this[i].r.sb)).toString(16)+"|"+(this[i].mt==undefined ? 0 :
this[i].mt).toString(16)+"|"+this[i].r.s+"|"+ja[i].t+"|"+ja[i].sf+".";
        }
        if (winnerid != undefined) { // One of the bidders has won
            winnerad=this[winnerid].r.ad;
            winnerk=ja[winnerid].k;
        } else { // The reserve has won
            winnerad=rs.r.ad.replace("[DATA]",data);
            winnerk="";
        }
        // Prepare URL to report back the winner to the auctioneer
        jt=jt.replace("[WINNERK]",winnerk).replace("[DATA]",data);
        // Garbage collect script tags
        this.f8GarbageCollect( );
        // Display the winner (either reserve or bidder ad)
        this.f4FillIframe(winnerad);
        // Track DATA only when winner is a bidder
        if (winnerk.length > 0) this.f1CallServer(jt);
    },
    f4FillIframe: function(url) {
        if (document.getElementById)
document.getElementById("c1IframeId").contentWindow.location.-
replace(url); else window.frames["c1IframeId"].location=url;
    },
    f5Poll: function( ) {
        if (this.v4TimeOut <= this.v6TimeSoFar ||
this.f2AllDone( )) {
            this.f3PickWinner( );
            return;
        }
        this.v6TimeSoFar += this.v7TimeIncrement;
        window.setTimeout("C1RTB.f5Poll( )",this.v7TimeIncrement);
    },
    // Call bidders by URL, dynamically replacing placeholders with
appropriate variables
    f6CallBidders: function( ) {
        var i;
        var c=0;
        var cookieE=this.cookieEnabled( );
        var flashE=this.flashEnabled( );
        // Age [AGE] and gender [GENDER] below, are
dynamically inserted at server side
        for (i in this.v10BiddersArray) {
            var url=this.v10BiddersArray[i].bidurl.
                replace("[CALLBACK]","C1RTB."+i).
                replace("[CACHEBUSTER]",this.time).
                replace("[COOKIE]",cookieE).
                replace("[FLASH]",flashE).
                replace("[AGE]","50").
```

-continued

```
            replace("[GENDER]","0").
            replace("[PUBLISHER_ID]",this.v13PubId).
    replace("[PUBLISHER_CATEGORY_ID]",this. v14PubCatId).
    replace("[ALGORITHM_VERSION]",this.v10BiddersArray[i].av).
    replace("[KEY_VERSION]",this.v10BiddersArray[i].kv).
    replace("[API_VERSION]",this.v12ProtocolVersion).
    replace("[ENCRYPTED_SCALE_TIMESTAMP]",this.v10Bidders
Array[i].sft);
            var encodedDom = encodeURI(this.dom);
            var maxlen = this.v15MaxUrlLength - (url.length-
"[DOMAIN]".length);
            url = url.replace("[DOMAIN]",
encodedDom.substr(0, maxlen));
            var script=this.f1CallServer(url);
            this.v11GarbageCan[c++]=script; // To be
garbage-collected later
        }
    },
    // Actual iframe ID and name are dynamically generated and
randomized
    f7CreateIframe:function( ) {
        document.write(" < iframe name='c1IfameId'
id='c1IframeId' width='"+this.v8Width+"'
height='"+this.v9Height+"' frameborder='0' scrolling='no'
marginwidth='0' marginheight='0' topmargin='0' leftmargin='0'
allowtransparency='true' > </iframe>");
    },
    f8GarbageCollect: function( ) {
        var i;
        for (i in this.v11GarbageCan) {
        this.headElement.removeChild(this.v11GarbageCan[i]);
        }
    }
}
C1RTB.f7CreateIframe( );
C1RTB.f6CallBidders( );
window.setTimeout("C1RTB.f5Poll( )",C1RTB.v5InitTime);
</script>
```

Once the end user browser 108 receives the RTB code from publisher 106A, the browser 108 sends bid requests to each bidder 106 and starts a timer. The bidders 106C decrypt the scale and timestamp and verify the recency of the bid request. Bidders 106C hold an internal auction (or perform their own internal analysis) and determine the bid that will be submitted. A JSON™ object is returned (to the end user browser 108 via the auctioneer 106B) with either a no bid/empty response or (1) a scaled bid CPM; (2) a signature with the scaled bid CPM and a timestamp); (3) a bidder creative URL; and (4) optional values (e.g., a minimum time). As described above, the scaled bid CPM (1) may not be encrypted. Further, the signature that embodies the scaled bid CPM and timestamp may be utilized to confirm the identity of the bidder 106C.

The minimum time provides the ability for the bidder 106C to specify the minutes for the auctioneer 106B to wait before sending another bid request for this user to a particular bidder's 106C URL.

The end user browser 108 picks the winning bid when all bids have arrived or when the auction times out. For each bidder, the browser 108 creates a package that includes: (1) the bidder ID; (2) the scaled bid CPM; (3) an encrypted string that contains the scale and the current timestamp; and (4) a signature embodying the scaled bid CPM and a timestamp.

The browser 108 makes a determination regarding who won the bid (e.g., whether a bidder 106C or the reserve amount). If no bid has met the reserve amount established, the auctioneer 106B records the reserve as the winner, records all bidder 106C packages and sends an ad to the end user browser 108 via the bidder 106C. Alternatively, if the bidder 106C wins the ad, the auctioneer 106B records all bidder packages, verifies the signature using the scaled bid CPM and timestamp, decrypts the encrypted string that has the scale and current timestamp, and verifies the recency of the bid. In addition, the auctioneer 106B records the bidder 106C as the winner with the descaled CPM. The bidder 106C then transmits the advertisement to the browser 108 where the winning ad is displayed.

Request Format

The auctioneer 106B works with each of the bidder 106C and determine details regarding a GET HTTP (hyper text transfer protocol) request for the URL (the bidding URL, request call, bid call, etc.) that dictates how the auctioneer will request bids from a particular bidder.

The bidding URL contains:
1. A base URL specified by the bidder 106C that may contain any information to identify the auctioneer 105B, adtype, etc., and may be similar in format to the bidder's 106C traditional ad calls. For example, the base URL may provide:
    http://bid.bidder.com/getbid?s=1234&z=728x90... or
    http://bid.bidder.com/getbid/1234/728x90 ...
2. A number of mandatory placeholders (properly delimited from one another) defined for a specific API version. Neither the auctioneer 106B, nor the bidder 106C can change the names of these placeholders since each JavaScript™ codebase associated with an API version expects a specific set of names for it to function properly.

Table A illustrates mandatory placeholders that may be utilized in accordance with a first request format.

TABLE A

| Placeholder | Type | Description |
| --- | --- | --- |
| [API_VERSION] | Integer, unsigned 8 bids | This value is 2, and is determined by a specification and provided by the auctioneer 106B in runtime. It represents the version of the spec based on which the auctioneer 106B is communicating with the bidder 106C. The API covers the auctioneer code that requests a bid from the bidder 106C, the bidder code that responds with a bid, and the auctioneer code (in the browser 108) that receives and processes the bid. Both the auctioneer 106B and the bidder 106C may be configured to handle two simultaneous versions of the API to enable them to transition from one API version to the next without service interruption. If [API_VERSION] is lacking from the bid request, then it means that the API version is 1, which has a scale factor of 1, and no encryption algorithm and no key. |

TABLE A-continued

| Placeholder | Type | Description |
| --- | --- | --- |
| [CALLBACK] | String | This 10-character value is generated by the auctioneer 106B, which the bidder 106C will use in its response. As the value of this string will be used as a JavaScript ™ variable name within a bidding event, this value will be different for each bid request, and different for each bidder 106C within a single bidding event. Permissible characters are 0-9, a-z, and A-Z. |
| [CACHEBUSTER] | Integer, padded unsigned 32 bits | This 10-digit random number generated by the auctioneer 106B is used for browser 108 cache-busting. This number is different for each bid request. |
| [ALGORITHM_VERSION] | Integer, unsigned 8 bits | The ID of the algorithm that the auctioneer 106B uses to communicate with the bidder 106C. It is the same value for all bidders 106C across all bidding events across all Auctioneers 106B. The details of the algorithm behind a new version ID are determined and agreed upon offline, and implemented by all auctioneers 106B and bidders 106C before being put into production. As changes to the algorithm are introduced, auctioneers 106B and bidders 106C need to be able to handle two simultaneous versions of the algorithm in runtime to enable them to transition from one algorithm version to the next without service interruption. |
| [KEY_VERSION] | Integer, unsigned 8 bits | The ID of the private key that the auctioneer 106B and bidder 106C use between them for all communications Auctioneers' 106B and bidders' 106C systems need to be able to work with two simultaneous keys at any point in time to enable them to transition from one key to the next without service interruption. |
| [ENCRYPTED_SCALE_TIME STAMP] | String | The value is the encrypted version of the string that is the concatenation of the scale factor, a pipe, and the current timestamp. The encryption mechanism is based on the specification version's algorithm and the private key defined a priori between the auctioneer 106B and the bidder 106C. The unencrypted scale is generated and provided by the auctioneer 106B and is a random 3-digit integer. It is the same for all bidders 106C in a bidding event, but is different across bidding events. The unencrypted time stamp is generated and provided by the auctioneer 106B and is the time expressed in seconds since Jan. 1, 1970 UTC. It is the same for all bidders 106C in a bidding event, but is different across bidding events. The bidder 106C will decrypt the value of the encrypted scale and timestamp combination, then use the timestamp to compare against the timestamp in its system. If the two timestamps are within some time period, then the bidder 106C will respond with a JSON object that would contain a scaled bid, otherwise it will respond with a no-bid JSON response, and record a 'Timestamps too far out' error condition. |

Table B illustrates optional placeholders used in accordance with a first request format.

TABLE A

| Placeholder | Type | Description |
| --- | --- | --- |
| [AGE] | Integer, unsigned 8 bits | The 3-digit value represents the age of the end user as determined by the auctioneer 106B, or Null of the age is unknown to the auctioneer 106B. E.g. 25 means 25-year old. |
| [GENDER] | Integer, unsigned 8 bits | The value identifies the gender of the end user as determined by the auctioneer 106B. Value is 0 for male, 1 for female, and null for those users whose gender the auctioneer 106B does not know. |

TABLE A-continued

| Placeholder | Type | Description |
|---|---|---|
| [PUBLISHER_ID] | Integer, unsigned 32 bits | The value identifies the ID of the publisher 106A from where this impression is emanating. This value can be used for learning/optimization at the bidder 106C or for targeting/blocking. |
| [PUBLISHER_CATEGORY_ID] | Integer, unsigned 32 bits | The value identifies the ID of the category of the publisher 106A from where this impression is emanating. This value can be used for learning/optimization at the bidder 106C or for targeting/blocking. |
| [COOKIE] | Boolean | The single-digit value allows the auctioneer 106B to indicate to the bidder 106C that the end user browser 108 is blocking 3rd party cookies. Value is 0 if 3rd party cookies are blocked, and 1 if they are allowed. |
| [FLASH] | Boolean | The single-digit value allows the auctioneer 106B to indicate to the bidder 106C whether the end user browser 108 supports Flash. Value is 0 if Flash is not supported, and 1 if it is. |
| [DOMAIN] | String | The referring URL truncated by the auctioneer 106B JavaScript ™ code to as many characters as can be included such that the total length of the request URL does not exceed 1,024 characters. The referring URL is where the impression is emanating from. This value can be used for learning/optimization at the bidder 106C or for targeting/blocking. This is a mandatory value for the auctioneer 106B to pass if the bidder 106C asks to receive it. The value passed should be URL-encoded: E.g. 'http%3A//us.mg2.mail.yahoo.com/dc/launch%3F.gx%3D1%26.rand'. |

The final URLs with placeholders may appear as:

```
http://bid.bidder.com/getbid?s=1234&z=728x90&enc=[ALGORITHM_VERSION
].[KEY_VERSION]&api=[API_VERSION]&cb=[CALLBACK]&cache
=[CACHEBUSTER]&e_scale_time=[ENCRYPTED_SCALE_TIMESTAMP
]&age=[AGE]&gender=[GENDER]&pub=[PUBLISHER_ID]&pcat=[PUBLISHER
_CATEGORY_ID]&c=[COOKIE]&f=[FLASH]&d=[DOMAIN]
```
or:
```
http://bid.bidder.com/getbid/1234/728x90/=[ALGORITHM_VERSION]/[KEY
_VERSION]/[CACHEBUSTER]/[COOKIE][FLASH]/[CALLBACK]/[ENCRYPTED
_SCALE_TIMESTAMP]/[PUBLISHER_CATEGORY_ID].[PUBLISHER
_ID]/[API_VERSION]/[DOMAIN]
```

At runtime, the auctioneer 106B may expand the placeholders with their appropriate values. For example, if the placeholders had these values:

[API_VERSION]=2
[CALLBACK]=XhYmshu182
[CACHEBUSTER]=1828282828
[ALGORITHM_VERSION]=2
[KEY_VERSION]=3
[ENCRYPTED_SCALE_TIMESTAMP]=d723hjf38rj2f
[AGE]=28
[GENDER]=1
[PUBLISHER_ID]=619
[PUBLISHER_CATEGORY_ID]=23
[COOKIE]=1
[FLASH]=0
[DOMAIN]=http%3A//us.mg2.mail yahoo.com/dc/launch %3F.gx%3D1%26.rand Then, the fully expanded and populated calls corresponding to the example bidding URLs above would respectively be:

```
http://bid.bidder.com/getbid?s=1234&z=728x90&enc=2.3&api=2&cb=Xh
Ymshu182&cache=1828282828&enc=2.3&e_scale_time=d723hjf38rj2f&age
=28&gender=1
&pub=619&pcat=23&c=1&f=0&d=http%3A//us.mg2.mail.yahoo.com/dc/launch
%3F.gx%3D1%26.rand
```
or:
```
http://bid.bidder.com/getbid?s=1234&z=728x90/2/3/1828282828/10/XhYms
hu182/d723hjf38rj2f/23.619/2/http%3A//us.mg2.mail.yahoo.com/dc/launch%
3F.gx%3D1%26.rand
```

Response Format

Once a request has been issued per the above, the bidder 106C responds. The description herein illustrates an example response format. The bidder 106C may 20 respond with a JSON™ object with mime type of text/html. The names of this object's individual data elements are defined for a specific API version across all auctioneers 106B and bidders 106C. Neither the auctioneer 106B, nor the bidder 106C can change the naming convention of the response JSON™ object since each JavaScript™ codebase associated with an API version expects a specific set of names in JSON™ for the JavaScript™ to function properly.

The bidder 106C can send a regular bid, a no-bid, or an error response.

The JSON™ object for a regular bid may contain a number of mandatory elements:

(a) r: A fixed string name whose value is the remaining data elements of the JSON record;

(b) sb: A fixed string name whose value, [SCALED_BID_CPM], is an integer containing the scaled bid in cost per 10,000,000 impressions. For example, for a bid of $0.738279 eCPM, the bid value should be the integer 7383, and with a scale factor of 5 for this impression, the value of sb would be 36915=(scale factor)*trunc(10,000*the real CPM). The reason a cost per 10,000,000 is utilized is to be able to support CPM values lower than $1.00 CPM in an integer format;

s: A fixed string name whose value, [SIGNATURE], is the output of the hash function that has as input the concatenation, using a '|' (pipe) delimiter, of the text representation of the sb value and the text representation of the decrypted value of the timestamp found in [ENCRYPTED_SCALE_TIMESTAMP] placeholder passed by the auctioneer 106B to the bidder 106C on the bid request. If this bidder 106C wins, this signature makes its way to the auctioneer 106B who compares it to the hash function that the auctioneer 106B generates out of the sb and the value of timestamp found in the [ENCRYPTED_SCALE_TIMESTAMP] that's being passed along since the bidding event started. If the two signatures match, then the auctioneer 106B tags this response as valid, otherwise it records it in the 'Signatures not matching' error condition log;

ad: A fixed string name whose value, [AD], is the URL of the ad to be displayed if the bidder 106C wins this bidding event.

The JSON™ object could contain an optional element as well:

(e) mt: A fixed string name whose value, [MINIMUM_TIME], is the least amount of time the bidder 106C wants the auctioneer 106B not to call the bidder 106C again for this user for this bidding URL. The amount is in minutes (e.g., 30 means 30 minutes). This mechanism allows the bidder 106C control over the users it does not want to see. If this value is sent, the auctioneer 106B needs to enforce it.

The bidder's 106C JSON™ response for a regular bid may be:

[CALLBACK]={"r":{"sb":[SCALED_BID_CPM],
"s":"[SIGNATURE]","ad":"[AD]"], "mt":[MINIMUM_TIME]};

In case the bidder 106C does not want to bid, the response will be:

[CALLBACK]={"mt":[MINIMUM_TIME]};

And in case of errors, the bidder 106C will send a JSON™ response indicating the error condition:

[CALLBACK]={"e":{"value":[VALUE],"desc":"[DESCRIPTION]"},
"mt":"[MINIMUM_TIME]};

At runtime, the bidder 106C will substitute the placeholders with their appropriate values. For example, if the placeholders had these values:

[SCALED_BID_CPM]=36915

[SIGNATURE]=heyty3rde1

[AD]=http://bid.bidder.com?var2=26463&size=160600&random=633456915

[MINIMUM_TIME]=30 and if the [CALLBACK] string from the bid request was:

[CALLBACK]=XhYmshu182

Then, the example JSON™ response for a regular bid will be:
Where:

XhYmshu182={"r":{"sb":36915,"s":"heyty3rde1","ad":"
http://bid.bidder.com ?var2= 26463&size=160600&random=633456915"},
"mt":30};

XhYmsh182 is the value generated by the auctioneer 106B for the [CALLBACK] placeholder and already passed on to the bidder 106C in the bid call. In all cases, the JSON™ object should be set to this [CALLBACK] placeholder value passed to the bidder 106C above.
{"r":{"sb":36915, "s":"heyty3rde1","http://bid.bidder.com?var2=26463&size=160600&random=633456915"},"mt":30}: is the actual regular bid JSON™ object.

The JSON™ response for a no-bid may be:

XhYmshu182={"mt":30};

The JSON response in case the bidder 106C is unable to decrypt the auctioneer's 106B encrypted (scale, timestamp) may be:

XhYmshu182={"e": {"value": "5": "desc": "Decryption error"} "mt":30};

where:
'5' is one of the numbers below for Value.
'Timestamp expired' is the corresponding description.
Table C illustrates the list of possible error conditions, values, and descriptions:

TABLE C

| Value | Code | Description |
| --- | --- | --- |
| 1. | GENERAL_ERROR | Internal bidder 106C error |
| 2. | INVALID_API | API is invalid |
| 3. | MISSING_ENC | Enc (encryption v.n) parameter is missing |
| 4. | MISSING_SCALE_TIME | Scaletime parameter is missing |
| 5. | EXPIRED_TIMESTAMP | Timestamp expired |
| 6. | DECRYPTION_ERROR | Decryption error |

The bidder 106C should not change or use the http return code to indicate any bidding response condition.

For completeness, once the auction closes and the auctioneer 106B is notified, the latter will decrypt the value of the [ENCRYPTED_SCALE_TIMESTAMP] that it generated at the beginning of the bidding event, parse out the unencrypted timestamp and use it to compare against the current timestamp in its system. If the two timestamps are within some time period, then the auctioneer 106B will consider this a normal conclusion of auction, otherwise it will record a 'Timestamps too far out' error condition.

Trafficking Setup

At the auctioneer 106B system, the auctioneer 106B may choose to restrict bids to specific ad impressions based on various criteria and algorithms of its own choosing, which may be the same as those used in choosing when to server traditional non-RTB ads. For example, RTB campaigns may be set up the same way network sell campaign (tags) are. A campaign can be targeted to the full extent of the auctioneer's 106B ad server's capabilities, which could include (but may not be limited to):

IP address-based geo-lookup: Country, region, state, DMA, zip code, etc.
Day-of-week, day-part, and date-range
Technical operating system and browser type/version'
Contextualized/channelized
Brand safe content vs. user generated content (UGC)
Demographic: Age, gender, income level, marital status, etc.
Psychographic interests
Behavioral
Purchase intent However, actual trafficking is negotiated between the auctioneer's 106B sales team and the bidder's 106C media buying group. The standard trafficking is Run of Site (ROS)/Run of Network (RON) with no further information passed from auctioneer 106B to bidder 106C other than the mandatory request placeholders.

Security Measures

A number of measures are included to ensure secure communications and 25 minimization of fraudulent activity:

(1) To avoid manipulation of the auction script, all function names, variable names, class names and constants are dynamically generated random strings, for each bidding event.

(2) To avoid malicious spider requests, and using the previously exchanged private key, the auctioneer 106B passes an encrypted value of the scale and the timestamp on the request call to the bidder 106C. The bidder 106C decrypts this value to recover the original timestamp, and verifies the authenticity of the call by checking that this passed timestamp is within an acceptable amount of time from the bidder's 106C own current timestamp.

(3) To hide returned bid values from human eyes and from tools like browser toolbars, browser add-ons, etc. the bidder 106C returns the bid CPM as a scaled value. The scale used is a random number generated for each bidding event and passed by the auctioneer 106B to the bidder 106C using the encryption key known only to the auctioneer 106B and this bidder 106C. Only this bidder 106C knows how to decrypt the scale, and use it to scale up its bid CPM.

(4) To avoid tampering of the winner bid, the bidder 106C returns, together with the scaled CPM, a signature which is a hash function embodying the scaled CPM and the value of the original timestamp (the auctioneer's). The auctioneer 106B generates the same signature out of the same base parameters of scaled CPM and the original timestamp. The auctioneer 106B verifies the validity of the bidder 106C. Further, by checking the decrypted timestamp which is passed along in this bidding event to the current timestamp at the auctioneer 106B system, the auctioneer 106B is also able to verify the recency of the bid.

Guidelines

Although the above description enables the basic operation of the RTB mechanism, a number of functions may be built around the RTB system in order for both auctioneer 106B and bidder 106C to control its process. Table D describes the most important of these functions and is provided as guidance to auctioneers 106B or bidders 106C:

TABLE D

| # | Guideline Description |
|---|---|
| 1. | The auctioneer 106B should build a method to throttle each bidder's 106C requests using a daily, an hourly, a per-minute, or even a per-second cap in a manner that avoids traffic bursts so as not to overload the bidder's 106C system. Understandably, a uniform distribution might not be possible as most publishers 106A (and even exchanges that aggregate traffic from multiple sites) have unique traffic peaks and troughs over time, and may choose to send more or fewer requests during different periods. However, such a throttling mechanism would limit the maximum requests sent during a specific period of time. |
| 2. | The auctioneer 106B may cap the maximum number of bidders 106C on a single bidding event. At issue is that each browser 108 could implement the outbound bid request calls differently. Some browsers 108 might parallelize, which is ideal. Yet other browsers 108 might serialize creating potential delays in response. This slowness, which could have negative end user experience implications, potentially created by the auctioneer 106B calling many bidders 106C needs to be balanced against the auctioneer's 106B desire for a higher yield. The method of selecting bidders 106C is up to the auctioneer 106B, but the latter might consider relative revenue per bid request as a proxy for the opportunity cost of not offering a bid opportunity. |
| 3. | For each impression that will be the basis of a bidding event, the auctioneer 106B may call each of the chosen bidders 106C with only a single bid request. This streamlines all communications between the two parties, and avoid unnecessary bid calls. |
| 4. | In addition to receiving the [COOKIE] value above, a bidder 106C could ask an auctioneer 106B to only send it users 108 that accept third party cookies. This is given the fact that a bidder 106C will not have any information on such users 108 that would allow it to make competitive bids. |
| 5. | The bidder 106C may enforce the rule that an impression bought (won) through one RTB auction will not be turned around and sold again in a separate RTB auction. Double or triple RTB auctions will result in lowered end user 108 experiences as each RTB auction creates latency and delays the display of the final creative. |

TABLE D-continued

| # | Guideline Description |
|---|---|
| 6. | For the same purposes of not degrading end user 108 experience, auctioneers 106B may keep the RTB auctions to 500 ms or less, with this actual value to be determined based on experience at scale. |
| 7. | With the purpose of maximizing yield, the auctioneer 106B and bidder 106C may agree on the sharing of auctioneer based user information such as end user age, gender and behaviors, and page channels and context. It is up to the sales team of the auctioneer 106B and media buying group of the bidder 106C to come to an agreement, and possibly spell out in the form of a contract/IO/PO, as to which of these parameters can be used or stored by the bidder 106C for purposes other than the bidding event. |
| 8. | By definition, the bidder 106C will have access to the end user's IP Address, and http header information. These contain a number of important pieces of information regarding the geographical whereabouts (country, region, state/province, city, zip code) of the end user 108. This means that the bidder 106C does not need the auctioneer 106B to pass along any IP Address-based geographical data. The other data pieces that the bidder 106C has access to from within the http header are the operating system type/version, browser type/version, and the internet connectivity used by the end user 108. The bidder 106C may use these data pieces within its bidding decisioning logic. |
| 9. | Whereas any price type can be accommodated (e.g., CPM, CPC, CPA, and Revshare) in RTB, the CPM model may be more commonplace, as it decouples the auctioneer 106B from any issues originating from the bidder's 106C CPM estimation confidence levels. |
| 10. | The two parties in an RTB can decide whose numbers they will go off of for reporting and billing. It is expected that the auctioneer's 106B numbers will be utilized. The parties may need to expose to one another, on a daily basis, at least in console reporting, their respective tracked counts of requests and wins, and their respective total payout/revenue. A standard method for sharing this data may be utilized. |
| 11. | The current list of single-state variable data pieces being passed in the bid request URL (age, gender, publisher ID, publisher category ID, cookie, flash, domain) may be expanded to include other important variables as: above vs. below fold, Editorial or UGC, Brand Safe vs. not, etc. A standard method for sharing this data may be utilized. |
| 12. | In order to audit and combat fraud attempts:<br>Both the auctioneer 106B and bidder 106C may maintain and continuously check the record of all errors resulting from out of range timestamps.<br>The auctioneer 106B may additionally do the same for mismatched signatures. |
| 13. | If the end user 108 has opted out of behavioral advertising through the use of the Network Advertising Initiative (NAI) site, then the publisher 106A or auctioneer 106B should not pass end user-specific information (age, gender, and later behaviors, interests, etc,) to the bidders 106C on the bid request. |
| 14. | Domain passing is important in bringing to RTB those advertisers who want to maintain absolute control over where their ads run.<br>At a high level, the bidder 106C may implement a white-list (for targeting to) or a black-list (for blocking against) which would make campaigns eligible/ineligible based on the domain of the request. If a request arrives with no domain, then any campaign on the bidder's 106C side that is expressly checking for the domain would not be eligible.<br>If an auctioneer 106B is sending proportionately large numbers of impressions from undesirable domains, the auctioneer 106B can be asked to read the domain of the end impression and not call the bidder 106C for a bid. |

Integration/Adoption between Auctioneer/Bidder

To utilize the RTB system, and understanding and agreement must be adopted between the auctioneer 106B and the bidder 106C. The following illustrates an example of general timeline for adopting such an understanding:

(1) Auctioneer 106B and bidder 106C review the RTB specification version;

(2) Auctioneer 106B and bidder 106C understand their confidence intervals around their own system's eCPM estimation capability;

(3) Auctioneer 106B develops the auction initiation code, and the bidder 106C develops the bid response code in their respective ad servers;

(4) Bidder 106C decides on the final bid request URL within the guidelines described above;

(5) Bidder 106C performs an internal manual testing of call format and response times;

(6) Auctioneer 106B performs these same manual tests on the bidder 106C and a full load testing;

(7) Both parties 106B/106C launch with agreed upon initial capacity (can be as small as 1 million requests per day);

(8) Both parties 106B/106C confirm the proper operation of desired functionality;

(9) Both parties 106B/106C monitor counts, discrepancy, latency, bid levels, and win rates; and (10) Both parties 106B/106C ramp up by growing request volume over time, monitoring profit margins and continually scrutinizing all metrics.

With full technical development support, this timeline could be as short as three to four weeks for both auctioneers 106B and bidders 106C. Once two parties have conducted an RTB auction (i.e., with different parties), the two parties can easily conduct an auction with each other using the already adopted understanding Alternative Embodiments In one or more embodiments, all bids, scaled, encrypted or otherwise, are in United States dollars. Full currency support may also be provided in RTB.

A second price auction may also be provided. In a first price RTB auction implementation, the bidder 106C pays the amount it had bid if it wins the impression. Depending on demand from bidding members, a second price auction version may also be utilized. In a second price auction, instead of each bidder's 106C JSON™ response object containing only a single scaled bid, it would contain two. One would be the max this bidder is willing to pay for this impression and the second, a lower value, would be an amount incrementally higher than the second highest CPM that the bidder 106C has in its own system. The final winner is either the reserve CPM or the bidder 106C whose max bid was the highest CPM. However, if a bidder 106C wins, this bidder 106C would pay an amount only incrementally higher than the second highest max CPM value in the RTB auction.

A publisher 106A may also block advertisements. In one or more embodiments, there is no automated mechanism for the auctioneer 106B to let bidders 106C know that the publisher 106A owning this impression needs to block certain advertisers, types of advertisers, or characteristics of creatives from bidding, winning and displaying ads on the publisher's 106A site. Such types of blocking information may be communicated offline, and entered/trafficked manually into the bidder's 106C system. Alternatively, an automated mechanism may be utilized that brings RTB to those publishers 106A who want to maintain control over the types of ads they receive by reducing (through automation) their campaign management costs.

In broad terms, such an automated mechanism adds a new mandatory placeholder to the bid request URL. The value of this placeholder could be a number (e.g., 4.187) that, once appended to a URL predefined by the auctioneer 106B, would denote both the ID (4) of the end publisher 106A from where the impression is emanating as well as the sequential ID (187) of the blocking rules that need to be abided by for this impression. This URL defines the location of the XML document that contains all the blocking rules for all impressions coming from this end publisher 106A through this auctioneer 106B. Since the blocking rules do not change very often, the bidder 106C may cache the latest versions of each of these XML documents on a per-auctioneer 106B and per-publisher 106A basis. When the bidder 106C sees a new placeholder that it does not have in cache, it would read this new XML document in real-time, and act accordingly going forward. The bidder 106C may not bid on the bid request containing a new sequential ID in order not to create latency in the response. In addition, the standardization of major types of advertisers, and creative attributes, may benefit all auctioneers 106B and bidders 106C as they use the same industry-wide taxonomy and cut campaign management/trafficking costs.

The advertiser may also block a particular publisher 106A based on domain, publisher ID, or publisher category. If blocking is based on domains, the end publisher domain of the impression may be passed to the bidder 106C. The publisher 106A ID may also be passed to the bidder 106C. Further, the list of publisher IDs and their names may be shared. Such sharing may be provided as part of the real-time call as another XML document that the bidder 106C reads, thereby exposing the publisher IDs to the bidder 106C for it to block or target.

To block by publisher 106A category, an ID that indicates the category of the publisher from where this impression comes may be passed to the bidder 106C. Although this ID can be used for blocking, the major types of content may also be standardized benefiting all auctioneers 106B and bidders 106C by sharing the same industry-wide taxonomy, and cutting costs. To allow the bidder 106C to block/target properly, the current list of publisher 106A category IDs and their names may also be shared as yet another pointer to another XML document that the bidder 106C can read and expose internally to its traffickers.

The reporting of requests, won bid counts, and total dollars spent may be reported through an API, so as to cut down on the cost of labor needed to read these values from one console and enter into the other.

To minimize the possibility of fraud, data values may be encrypted by scaling the bids and encrypting both the bids and the timestamp. Additionally, more of the data values passed on the bid request URL may also be encrypted (e.g., demographic, behavioral and contextual nature data).

A single-state variable is one where the characteristic of the impression for that variable can only be in one state at any given time (e.g., age of end user, above or below the fold for the placement of an ad on the page, etc.). Additional single-state marketing data may also be standardized.

A multi-state variable is one where the impression's characteristic for that variable can be in more than one state at any given time. A number of key pieces of data may be multi-state, such as contextual categories/channels and end user hypertargets/behaviors/intents/life-stages. For contextual categories/channels, a particular impression can have a number of contexts at varying degrees of relevance. For example, an impression from a page that foremost discusses financed auto insurance could be tagged by car, insurance, and loans, each at a different probability level. The values passed could be utilized to standardize content pages. End user hypertargets/behaviors/intents/life-stages provide the ability for the end user to be responsible for a specific impression that can be tagged by a number of behaviors at varying confidence/probability levels. For example, tags may include extreme sport enthusiast, interested in LASIK surgery, and recently engaged, at different confidences. The standardization of end user data points may benefit all auctioneers 106B and bidders 106C as they share the same industry-wide taxonomy, and cut costs.

In addition to the foregoing, there are numerous alternative embodiments for equally accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide for secure real time bidding implemented in a method, apparatus, system, article of manufacture, and/or computer readable medium.

The foregoing is not intended to be exhaustive or to limit the invention to the precise form disclosed. While the present invention has been described with regards to particular embodiments, it is recognized that additional variations of the present invention may be devised without departing from the inventive concept. It is intended that the scope of the invention be limited not by this detailed description, but rather by the claims appended hereto.

What is claimed is:

1. A method for conducting a secure real-time auction for online display advertising in a computer system, comprising:
    an auctioneer establishing one or more different private keys, each different private key being used to communicate with a different bidder;
    the auctioneer receiving a request for an ad impression from a user browser;
    the auctioneer determining a reserve bid for the ad impression;

the auctioneer determining one or more bidders to bid for the ad impression;

the auctioneer determining a scale factor for the ad impression, the scale factor including a mechanism to obfuscate actual bid values before and during a real-time bidding process;

the auctioneer sending a bidding package to the user browser, the bidding package including;

an unencrypted scaled version of the reserve bid, the scaled version including the reserve bid that has been scaled based on the scale factor;

a reserve uniform resource locator (URL) of an advertisement associated with the reserve bid;

for each of the one or more bidders, a unique URL that identifies an encryption version and an encryption string that combines the scale factor and a current timestamp;

based on the bidding package, the user browser:

transmitting requests for bid responses to the one or more bidders;

receiving a bid response from each of the one or more bidders, wherein each bid response comprises:

a scaled bid for the bidder;

signature embodying the scaled bid and the timestamp; and a creative URL to which the ad impression should be redirected if the bidder wins;

determining which of the one or more bidders wins the bid for the ad impression by comparing each of the one or more scaled bids and the scaled version of the reserve bid;

redirecting the user browser to the creative URL for the winning bidder or to the reserve URL if no bidder wins; and the auctioneer receiving a pixel call from the user browser with details regarding the winning bid.

2. The method of claim 1, wherein the scale factor comprises an integer that is shared by all bidders for the ad impression.

3. A system for conducting a secure real-time auction for online display advertising in a computer system comprising:

an auctioneer computer having a memory; and a real-time bidding (RTB) application executing on the auctioneer computer, the RTB application being configured to:

establish one or more different private keys, each different private key being used to communicate with a different bidder;

receive a request for an ad impression from a user browser;

determine a reserve bid for the ad impression;

determine one or more bidders to bid for the ad impression;

determine a scale factor for the ad impression, the scale factor including a mechanism to obfuscate actual bid values before and during a real-time bidding process;

wherein, based on the bidding package, the user browser is configured to:

transmit requests for bid responses to the one or more bidders;

receive a bid response from each of the one or more bidders, each bid response including:

a scaled bid for the bidder; and a signature embodying the scaled bid and the timestamp.

4. The system of claim 3, wherein the scale factor comprises an integer that is shared by all bidders for the ad impression.

5. The system of claim 3, wherein the real-time bidding application is further configured to send a bidding package to the user browser, wherein the bidding package comprises:

an unencrypted scaled version of the reserve bid, wherein the scaled version comprises the reserve bid that has been scaled based on the scale factor;

a reserve uniform resource locator (URL) of an advertisement associated with the reserve bid; and for each of the one or more bidders, a unique URL that identifies an encryption version and an encryption string that combines the sale factor and a current timestamp.

6. The system of claim 5, wherein the sale factor comprises an integer that is shared by all bidders for the ad impression.

7. The system of claim 3, each bid further comprising a creative URL to which the ad impression should be redirected if the bidder wins.

8. The system of claim 7, wherein the sale factor comprises an integer that is shared by all bidders for the ad impression.

9. The system of claim 3, wherein the user browser is further configured to determine which of the one or more bidders wins the bid for the ad impression by comparing each of the one or more scaled bids and the scaled version of the reserve bid; and to redirect the user browser to the creative URL for the winning bidder or to the reserve URL if no bidder wins.

10. The system of claim 9, wherein the scale factor comprises an integer that is shared by all bidders for the ad impression.

11. The system of claim 3, wherein the RTB application on the auctioneer computer is further configured to receive a pixel call from the user browser with details regarding the winning bid.

12. The system of claim 11, wherein the scale factor comprises an integer that is shared by all bidders for the ad impression.

13. A non-transitory computer readable storage medium encoded with computer program instructions which when accessed by a computer cause the computer to load the program instructions to a memory therein, creating a special purpose data structure causing the computer to operator as an, auctioneer specially programmed computer, executing a method of conducting a secure real-time auction for online display advertising, comprising:

the auctioneer specially programmed computer establishing one or more different private keys, each different private key being used to communicate with a different bidder;

the auctioneer specially programmed computer receiving a request for an ad impression from a user browser;

the auctioneer specially programmed computer determining a reserve bid for the ad impression;

the auctioneer specially programmed computer determining one or more bidders to bid for ad impression;

the auctioneer specially programmed computer determining a scale factor for the ad impression, the scale factor including a mechanism to obfuscate actual bid values before and during a real-time bidding process;

based on the bidding package, the user browser being configured to:

transmit requests for bid responses to the one or more bidders;

receive a bid response from each of the one or more bidders, each bid response including:

a scaled bid for the bidder; and a signature embodying the scaled bid and the timestamp.

14. The non-transitory computer readable storage medium of claim 13, wherein the scale factor comprises an integer that is shared by all bidders for the ad impression.

15. The non-transitory computer readable storage medium of claim 13, further configured to send a bidding package to the user browser, the bidding package including:

an unencrypted scaled version of the bid, the scaled version including the reserve bid that has been scaled based on the scale factor;

a reserve uniform resource locator (URL) of an advertisement associated with the reserve bid; and for each of the one or more bidders, a unique URL that identifies an encryption version and an encryption string that combines the scale factor and a current timestamp.

16. The non-transitory computer readable storage medium of claim 15, wherein the scale factor comprises an integer that is shared by all bidders for the ad impression.

17. The non-transitory computer readable storage medium of claim 13, each bid further comprising a creative URL to which the ad impression should be redirected if the bidder wins.

18. The non-transitory computer readable storage medium of claim 17, wherein the scale factor comprises an integer that is shared by all bidders for the ad impression.

19. The non-transitory computer readable storage medium of claim 13, wherein the user browser is further configured to determine which of the one or more bidders wins the bid for the ad impression by comparing each of the one or more scaled bids and the scaled version of the reserve bid; and to redirect the user browser to the creative URL for the winning bidder or to the reserve URL if no bidder wins.

20. The non-transitory computer readable storage medium of claim 19, wherein the scale factor comprises an integer that is shared by all bidders for the ad impression.

21. The non-transitory computer readable storage medium of claim 13, wherein the auctioneer programmed computer is further configured to receive a pixel call from the user browser with details regarding the winning bid.

22. The non-transitory computer readable storage medium of claim 21, wherein the scale factor comprises an integer that is shared by all bidders for the ad impression.

* * * * *